US011108851B1

(12) United States Patent
Kurmala et al.

(10) Patent No.: US 11,108,851 B1
(45) Date of Patent: Aug. 31, 2021

(54) DYNAMIC APPLICATION ROUTING IN A SOFTWARE DEFINED WIDE AREA NETWORK

(71) Applicant: Hewlett Packard Enterprise Development LP, Houston, TX (US)

(72) Inventors: Hari Krishna Kurmala, Santa Clara, CA (US); Shreekanth Chandranna, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/845,326

(22) Filed: Apr. 10, 2020

(51) Int. Cl.
*G06F 15/16* (2006.01)
*H04L 29/08* (2006.01)

(52) U.S. Cl.
CPC ............... *H04L 67/1002* (2013.01)

(58) Field of Classification Search
CPC ............... H04L 67/1002; H04L 67/00; H04L 29/08072; H04L 29/08135
See application file for complete search history.

(56) References Cited

U.S. PATENT DOCUMENTS

| 7,996,526 | B2* | 8/2011 | Woundy | H04L 41/5054 709/224 |
| 8,504,679 | B2* | 8/2013 | Spire | G06F 11/0748 709/224 |
| 2011/0022812 | A1* | 1/2011 | van der Linden | H04L 67/1097 711/163 |
| 2012/0265976 | A1* | 10/2012 | Spiers | G06F 9/45533 713/2 |
| 2012/0330711 | A1* | 12/2012 | Jain | G06Q 30/04 705/7.23 |
| 2014/0052864 | A1* | 2/2014 | Van Der Linden | H04L 47/70 709/226 |
| 2014/0108665 | A1* | 4/2014 | Arora | H04L 65/1069 709/227 |
| 2014/0337500 | A1* | 11/2014 | Lee | H04L 67/10 709/223 |
| 2015/0085663 | A1* | 3/2015 | McMurry | H04L 41/5025 370/236 |
| 2015/0103769 | A1* | 4/2015 | Kaichis | H04W 72/0486 370/329 |
| 2015/0215276 | A1* | 7/2015 | Bhagwat | H04L 61/2015 709/220 |

(Continued)

*Primary Examiner* — Razu A Miah
(74) *Attorney, Agent, or Firm* — Hewlett Packard Enterprise Patent Department (57) ABSTRACT

Disclosed is a network infrastructure device including processing circuitry and a non-transitory, computer-readable medium including instructions that, when executed by the processing circuitry, cause the network infrastructure device to perform certain actions. The actions include receiving first information indicating resource utilization of headend gateways for forwarding data of a first application, receiving second information indicating resource utilization of branch gateways for forwarding data of a second application, forwarding data of the first application across a WAN link to a first headend gateway best suited to forward data of the first application, and forwarding data of the second application across a WAN link to a second headend gateway best suited to forward data of the second application.

17 Claims, 5 Drawing Sheets

(56) References Cited

U.S. PATENT DOCUMENTS

| | | | |
|---|---|---|---|
| 2015/0381568 A1* | 12/2015 | Johnson | G06Q 10/10 726/15 |
| 2016/0080211 A1* | 3/2016 | Anand | H04L 43/0817 709/224 |
| 2016/0080230 A1* | 3/2016 | Anand | H04L 47/32 709/224 |
| 2016/0080251 A1* | 3/2016 | Ramachandran | H04L 47/22 370/389 |
| 2016/0080280 A1* | 3/2016 | Ramachandran | H04L 43/0817 370/235 |
| 2016/0094422 A1* | 3/2016 | Poola | H04L 67/1002 709/224 |
| 2016/0142253 A1* | 5/2016 | Steinder | G06N 7/005 709/221 |
| 2018/0123912 A1* | 5/2018 | Bryant | G06Q 10/0631 |

* cited by examiner

DYNAMIC APPLICATION ROUTING IN A SOFTWARE DEFINED WIDE AREA NETWORK

BACKGROUND

A wide area network (WAN) may extend across multiple network sites (e.g. geographical, logical). Sites of the WAN are interconnected so that devices at one site can access resources at another site. In some topologies, many services and resources are installed at core sites (e.g. datacenters, headquarters), and many branch sites (e.g. regional offices, retail stores) connect client devices (e.g. laptops, smartphones, internet of things devices) to the WAN, These types of topologies are often used by enterprises in establishing their corporate network.

Each network site has its own local area network (LAN) that is connected to the other LANs of the other sites to form the WAN. Networking infrastructure, such as switches and routers are used to forward network traffic through each of the LANs, through the WAN as a whole, and between the WAN and the Internet. Each network site's LAN is connected to the wider network (e.g. to the WAN, to the Internet) through a gateway router. Branch gateways (BGs) connect branch sites to the wider network, and headend gateways (also known as virtual internet gateways) connect core sites to the wider network.

Often, WANs are implemented using software defined wide area network (SD-WAN) technology. SD-WAN decouples (logically or physically) the control aspects of switching and routing from the physical routing of the network traffic. In some SD-WAN implementations, each gateway (BGs and head-end gateways) controls certain aspects of routing for their respective LAN, but a network orchestrator controls the overall switching and routing across the WAN.

Connections are often formed between network sites to transact data relating to a certain application. The application may be operating from a datacenter (e.g. an "on-prem" payroll software), from a cloud based server (e.g. traditional cloud hosted web services), as a service (e.g. software as a service), or via other provisioning models. Often, there are multiple paths through the WAN from an end user device to an application.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Certain examples have features that are in addition to or in lieu of the features illustrated in the above-referenced figures. Certain labels may be omitted from certain figures for the sake of clarity.

DETAILED DESCRIPTION

In a software defined wide area network (SD-WAN), there may be multiple paths to connect two devices. Not only may there be multiple direct links between two network sites (e.g. connections using different technology, different internet service providers, redundant connections, redundant gateway devices), but there may also be multiple indirect links (e.g. network site A connecting to network site B via network site C). In connecting the two devices, the SD-WAN may utilize any one or more of the available paths, based on a variety of factors, including the type of application using the connection and the health of the WAN links between the network sites.

An added layer of complexity to the routing decision is introduced when an application is hosted and/or accessible from multiple network sites. For example, an "on-prem" payroll application may be hosted in multiple enterprise datacenters globally. Similarly, multiple network sites may allow connections to a cloud-based web application. When routing the connection for such a multi-site application, a SD-WAN must take into account not only the path costs to get to a certain network site, but the fact that multiple network sites are candidates for a connection to the application.

Traditionally, in non-software defined WANs, different network sites could be treated as adjacent, and routing protocols could pass information about the end-to-end network health to the entire network. However, in SD-WAN, the network sites cannot be treated as adjacent, and many of the protocols that were used in legacy WANs cannot be deployed when the Internet is intervening between sites. Therefore, inter-site information sharing in the SD-WAN is usually health information about the intervening WAN link.

In an example consistent with this disclosure, a headend gateway at a network site that hosts and/or connects to one or more applications gathers information about its health and resource usage, as well as information about the network quality from the headend gateway to the application. This information is provided to a cloud-based network orchestrator and/or to branch gateways of the WAN, depending on the specific topology of the SD-WAN. A person having ordinary skill in the art would recognize the topologies and situations when each approach would be advantageous.

This health information provided by the headend gateway can then be combined with additional path health information (e.g. WAN link health, branch gateway health, etc.) to assign a best path from an end user device to the application.

This invention improves the technology of dynamic path selection in SD-WANs. In situations where. WAN link health for a set of network paths does not provide the same path suitability order as the full health information provided in this invention, implementation of this invention improves performance of the network.

Figure 1:
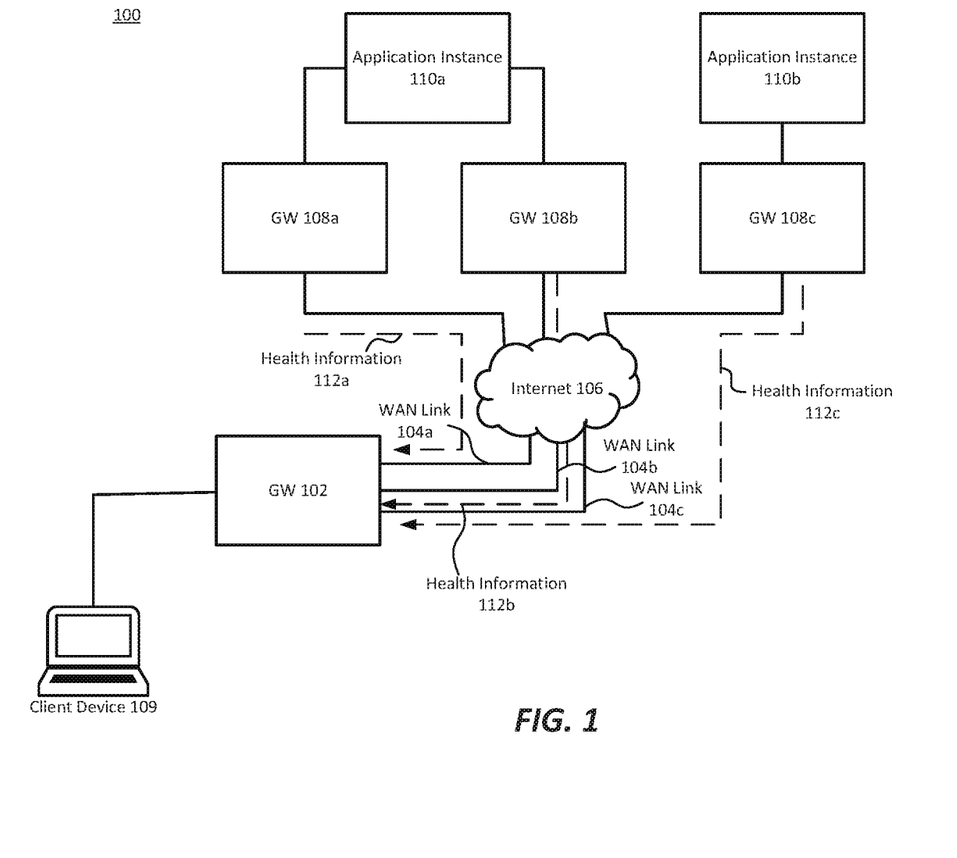
FIG. 1 illustrates an example wide area network (WAN) using software defined wide area network (SD-WAN) technology.

FIG. 1 illustrates an example software defined wide area network (SD-WAN). SD-WAN 100 (also more generically referred to in this disclosure as a wide area network (WAN)) includes a branch site which includes a branch gateway 102 and a client device 109. The branch site is connected to other sites via WAN links 104 that traverse Internet 106. Headend gateways 108 are located in the other sites and are coupled to application instances 110. Health information 112 is forwarded from headend gateways 108 to branch gateway 102 via WAN links 104.

Branch gateway 102 routes data to and from the branch site via WAN links 104a-c. The data being routed may include application data for applications used by client device 109. For example, a payroll application may be hosted in multiple sites across the WAN. Client device 109 may belong to an HR employee in charge of administering payroll from the branch site. In traditional SD-WANs, branch gateway 102 is pre-programmed to route application traffic to a certain network site (usually a core site, such as headquarters). Often, in traditional WANs, the network topology is arranged in a "hub and spoke" pattern where traffic from the branch site to any other site in the WAN is routed by branch gateway 102 through a core site (the "huh") to the destination site.

However, certain features of SD-WANs have allowed different network topologies to proliferate, including full mesh WANs (every network site is connected to ever other network site) and regional mesh WANs (every network site is connected to every other network site in the same geographical region, as well as to core network sites globally). Technologies like dynamic path selection (DPS) allow traffic to be routed between sites via a best performant WAN link 104. Load balancing allows traffic to be split between multiple redundant WAN links 104, thus better utilizing available bandwidth. However, these technologies are limited in their ability to inform the network as to the truly best path from a client device 109 to an application instance 110.

In some traditional SD-WAN deployments, probes are sent between branch gateway 102 and headend gateways 108 to determine the health of respective WAN links 104. While this information is helpful in determining a best path to a destination, the network beyond the WAN facing interfaces of the headend gateways 108 are not put to test by these probes. Further, while probes can imitate traffic of a specific application or type of application, they do not perfectly behave like the data traffic of the application itself. For example, if cryptographic hardware of the headend gateway is required for the data traffic of the application, that hardware may not be put to test by the probes.

Furthermore, the health and behavior of the local area network (LAN) of the network site associated with each headend gateway 108 is not put to test. In certain examples, a first path with a better suited WAN link 104 may be less well suited for forwarding data of an application than a second path with a less well suited WAN link 104, but better suited headend gateway 108 and headend network site LAN.

In examples consistent with FIG. 1 of this disclosure, each headend gateway 108 gathers per-application health metrics, as well as device-wide metrics. Periodically, each headend gateway 108 transmits health information 112 to branch gateway 102 via a respective WAN link 104. Branch gateway 102 then determines, using both probing data relating to WAN links 104 and health information 112, a best suited path to an application instance 110.

In an example consistent with FIG. 1, if client device 109 is attempting to access a cloud-based service, application instances 110 may be connectors from each core network site (e.g. datacenter, headquarters) to the cloud-based service. Headend gateways 108a and 108b may be dual headend gateways for a single network site ("site A"), and corresponding WAN links 104a and 104b may be redundant links from branch gateway 102 to site A. Headend gateway 108c may be a headend gateway for a different network site ("site B"), and corresponding WAN link 104c may be a link from branch gateway 102 to site B.

In this example, application instance 110a is a connector from site A to the cloud-based service and application instance 110b is a connector from site B to the cloud-based service. Client device 109 can access the cloud-based service using either application instance 110. In traditional WANs, branch gateway 102 is configured to default to a "best" core site by a network administrator based on geography and other considerations. In some SD-WANs, branch gateway 102 may automatically select a WAN link 104 for cloud-based service data traffic from the available WAN links connecting to the "best" core site based on WAN link health information gathered through probing. However, it is possible that the most suitable path to the cloud-based service does not correspond with the most suitable WAN link 104 of the pre-configured "best" core site.

In this example, branch gateway 102 consolidates the WAN link health information with health information 112 from each headend gateway 108 and determines a best path through the WAN 100. Depending on the specific characteristics of the cloud-based service, each parameter in the consolidated information is weighted to determine a suitability score for each path. For example, if the cloud-based service is a video conferencing services, latency and packet drop rate are weighted strongly relative to other parameters, but if the could-based service is document storage, latency and packet drop rate are weighted weakly relative to other parameters.

In this example, WAN link 104a is the most performant, WAN link 104b the next most performant, and WAN link 104c the least performant. However, due to cryptographic load on headend gateway 108a (as reported in health information 112a), the path using WAN link 104b is the best scoring path, followed by the path using WAN link 104c and the worst scoring path is the path using WAN link 104a. Thus branch gateway 102 chooses WAN link 104b to route the cloud-based service traffic between client device 109 and application instance 110a, Another application may not use the cryptographic resources of the headend gateway 108, and thus branch gateway 102 may select the path using WAN link 104a, since the high cryptographic load on headend gateway 108a is of no concern to the other application.

In some examples, health information 112 contains information only about the respective headend gateway 108. In some other examples, health information 112 also contains information about the LAN-side network all the way to the application instance 110 and/or to the application server itself. In certain examples, separate health information 112 may be sent for each active application and/or health information 112 may include application-specific information. As discussed in the above example, each application forwarded between the branch site and other network sites may be independently routed through the WAN. Although this routing decision is illustrated as happening only once, branch gateway 102 may periodically recalculate the best suited path for each application and may adjust which path the application uses based on manners well known to a person having ordinary skill in the art.

Although the above examples describe selecting a single best suited path from the client device 109 to an application instance 110, data traffic for an application can be routed via more than one path. These multiple paths may be redundant paths to the same network site or multiple paths to multiple sites with application instances 110.

Figure 2:
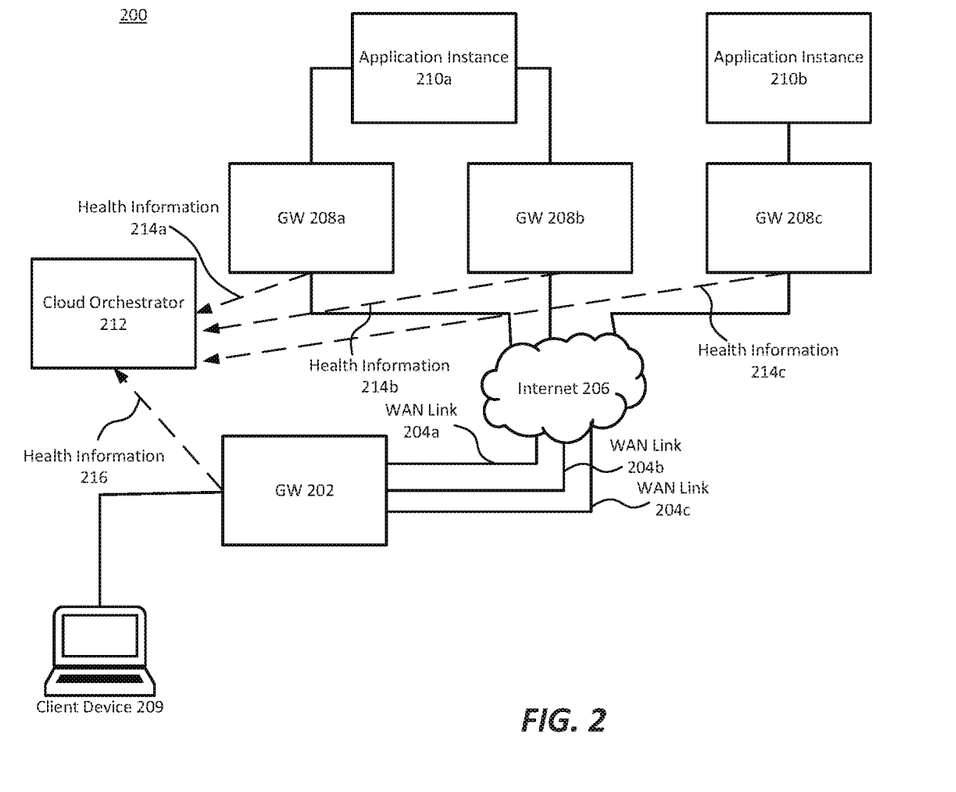
FIG. 2 illustrates another example WAN using SD-WAN technology.

FIG. 2 illustrates another example WAN using SD-WAN technology. SD-WAN 200 includes a branch site which includes a branch gateway 202 and a client device 209. The branch site is connected to other sites via WAN links 204 that traverse Internet 206. Headend gateways 208 are located in the other sites and are coupled to application instances 210. Health information 214 is forwarded from headend gateways 208 to cloud orchestrator 212 via Internet 206. Health information 216 is forwarded from branch gateway 202 to cloud orchestrator 212 via Internet 206.

Branch gateway 202 routes data to and from the branch site via WAN links 204a-c. The data being routed may include application data for applications used by client device 209. For example, a payroll application may be hosted in multiple sites across the WAN. Client device 209 may belong to an HR employee in charge of administering payroll from the branch site.

Probes are sent between branch gateway 202 and headend gateways 208 to determine the health of respective WAN links 204. While this information is helpful in determining a best path to a destination, the network beyond the WAN facing interfaces of the headend gateways 208 are not put to test by these probes.

Each headend gateway 208 gathers per-application health metrics, as well as device-wide metrics. Periodically, each headend gateway 208 transmits health information 214 to cloud orchestrator 212 via Internet 206. In some examples, branch gateway 202 gathers health information 216 about WAN links 204, including probing data, and relays health information 216 to cloud orchestrator 212 via Internet 206. Cloud orchestrator, then analyzes health information 214 and 216 to determine a best suited path from client device 209 to an application instance 210.

In an example consistent with FIG. 2, if client device 209 is attempting to access a service hosted on premises in the enterprise network, application instances 210 may be application servers hosted at each core network site (e.g. datacenter, headquarters). Headend gateways 208a and 208b may be dual headend gateways for a single network site ("site A"), and corresponding WAN links 204a and 204b may be redundant links from branch gateway 202 to site A. Headend gateway 208c may be a headend gateway for a different network site ("site B"), and corresponding WAN link 204c may be a link from branch gateway 202 to site B.

In this example, application instance 210a is an application server hosted in site A and application instance 210b is an application server hosted in site B. Client device 209 can access the application using either application instance 210.

In this example, cloud orchestrator 212 consolidates health information 216 from branch gateway 202 with health information 214 from each headend gateway 208 and determines a best path through the WAN 200. Depending on the specific characteristics of the application, each parameter in the consolidated information is weighted to determine a suitability score for each path. For example, if the application is a video conferencing service, latency and packet drop rate are weighted strongly relative to other parameters, but if the application is document storage, latency and packet drop rate are weighted weakly relative to other parameters.

In this example, WAN link 204b is the most performant, WAN link 204c the next most performant, and WAN link 204a the least performant. The performance information of each of the WAN links 204 may be provided by branch gateway 202. In some examples, portions or all of the WAN link performance information may be provided to cloud orchestrated 212 in health information 214 from headend gateways 208.

Due to load on headend gateway 208b (as reported in health information 214h), the path using WAN link 204c is the best scoring path, followed by the path using WAN link 204a and the worst scoring path is the path using WAN link 204b. Thus cloud orchestrator 212 chooses WAN link 204c to route the application traffic between client device 209 and application instance 210b. Another application may not be as strongly impacted by the particular loading of headend gateway 208b, and thus cloud orchestrator 212 may select the path using WAN link 204a, since the high load on headend gateway 208b is of no concern to the other application.

In some examples, health information 214 contains information only about the respective headend gateway 208. In some other examples, health information 214 also contains information about the LAN-side network all the way to the application instance 210 and/or to the application server itself. In certain examples, separate health information 214 may be sent for each active application and/or health information 214 may include application-specific information. As discussed in the above example, each application forwarded between the branch site and other network sites may be independently routed through the WAN. Although this routing decision is illustrated as happening only once, cloud orchestrator 212 may periodically recalculate the best suited path for each application and may adjust which path the application uses based on manners well known to a person having ordinary skill in the art. In some such examples, some or all of the data from the prior routing decision may be retained and used when deciding whether to adjust the updated routing decision. In other such examples, an updated routing decision is determined in much the same process as described above for an initial routing decision.

Although the above examples describe selecting a single best suited path from the client device 209 to an application instance 210, data traffic for an application can be routed via more than one path. These multiple paths may be redundant paths to the same network site or multiple paths to multiple sites with application instances 210.

Figure 3:
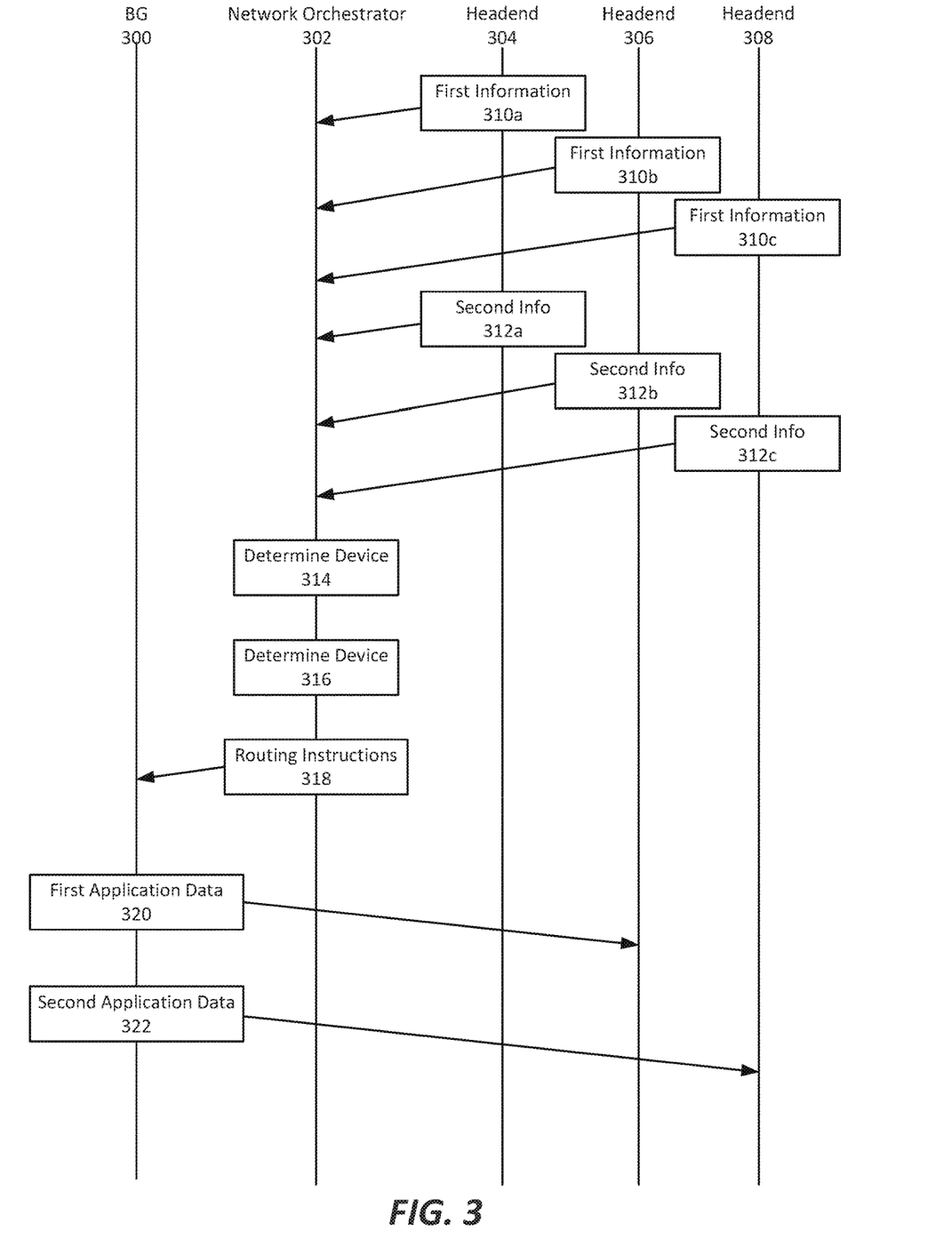
FIG. 3 illustrates an example data flow diagram for an example SD-WAN.

Once a routing decision is determined, cloud orchestrator 212 transmits instructions to branch gateway 202 to forward application data traffic pursuant to the routing decision. In some examples, the instructions are in the form of a SD-WAN flow. In certain examples, instructions are also transmitted to the selected headend gateway 208 to forward the application data traffic pursuant to the routing decision, FIG. 3 is a data flow diagram for an example SD-WAN, The data flow diagram includes the following nodes. Branch gateway 300, network orchestrator 302, headend gateway 304, headend gateway 306, and headend gateway 308. The data flow diagram illustrates determining how to route data for a pair of applications within the SD-WAN.

Messages 310a-c are first health information relating to a first application from headend gateways 304, 306, and 308, respectively. Each message 310 may include gateway health information such as gateway CPU utilization, cryptographic hardware utilization, number of concurrent sessions and throughput. In some examples, each message 310 also includes application-specific gateway health information, such as the aforementioned gateway health information filtered to the first application. In certain examples, each message 310 also includes application-specific health information for the path between the respective headend gateway and the respective application instance. Such application-specific path health information may include parameters such as jitter, latency, packet drop rate, throughput rate, etc.

Similarly, messages 312a-c are second health information relating to a second application from headend gateways 304, 306, and 308, respectively. Each message 312 may include gateway health information such as gateway CPU utilization, cryptographic hardware utilization, number of concurrent sessions and throughput. In some examples, each message 312 also includes application-specific gateway health information, such as the aforementioned gateway health information filtered to the second application. In certain examples, each message 312 also includes application-specific health information for the path between the respective headend gateway and the respective application instance. Such application-specific path health information may include parameters such as jitter, latency, packet drop rate, throughput rate, etc.

Once messages 310a-c are received at network orchestrator 302 (which may be a cloud orchestrator, an on premises orchestrator, an orchestration service, or any other form of orchestrator), network orchestrator 302 determines 314, based in part on the first health information received in messages 310a-c a headend gateway 304, 306, or 308 best suited to forward data of the first application to and from branch gateway 300. In some examples, additional information about WAN links between branch gateway 300 and headend gateways 304, 306, and 308 is considered when determining which headend gateway to select.

Once messages 312a-c are received at network orchestrator 302 (which may be a cloud orchestrator, an on premises orchestrator, an orchestration service, or any other form of orchestrator), network orchestrator 302 determines 316, based in part on the first health information received in messages 310a-c a headend gateway 304, 306, or 308 best suited to forward data of the second application to and from branch gateway 300. In some examples, additional information about WAN links between branch gateway 300 and headend gateways 304, 306, and 308 is considered when determining which headend gateway to select.

Upon determining 314, 316 devices for the first and second applications, network orchestrator 302 transmits routing instructions 318 to branch gateway 300. Routing instructions may include a flow or other routing command that instructs branch gateway 300 to forward first application data traffic to headend gateway 306 and a flow or other routing command that instructs branch gateway 300 to forward second application data traffic to headend gateway 308.

Branch gateway 300 then forwards first application data 320 to headend gateway 306 and second application data 322 to headend gateway 308 per the received routing instructions 318. A person having ordinary skill in the art would recognize that forwarding data traffic across a SD-WAN per routing instructions is well known in the art.

Figure 4:
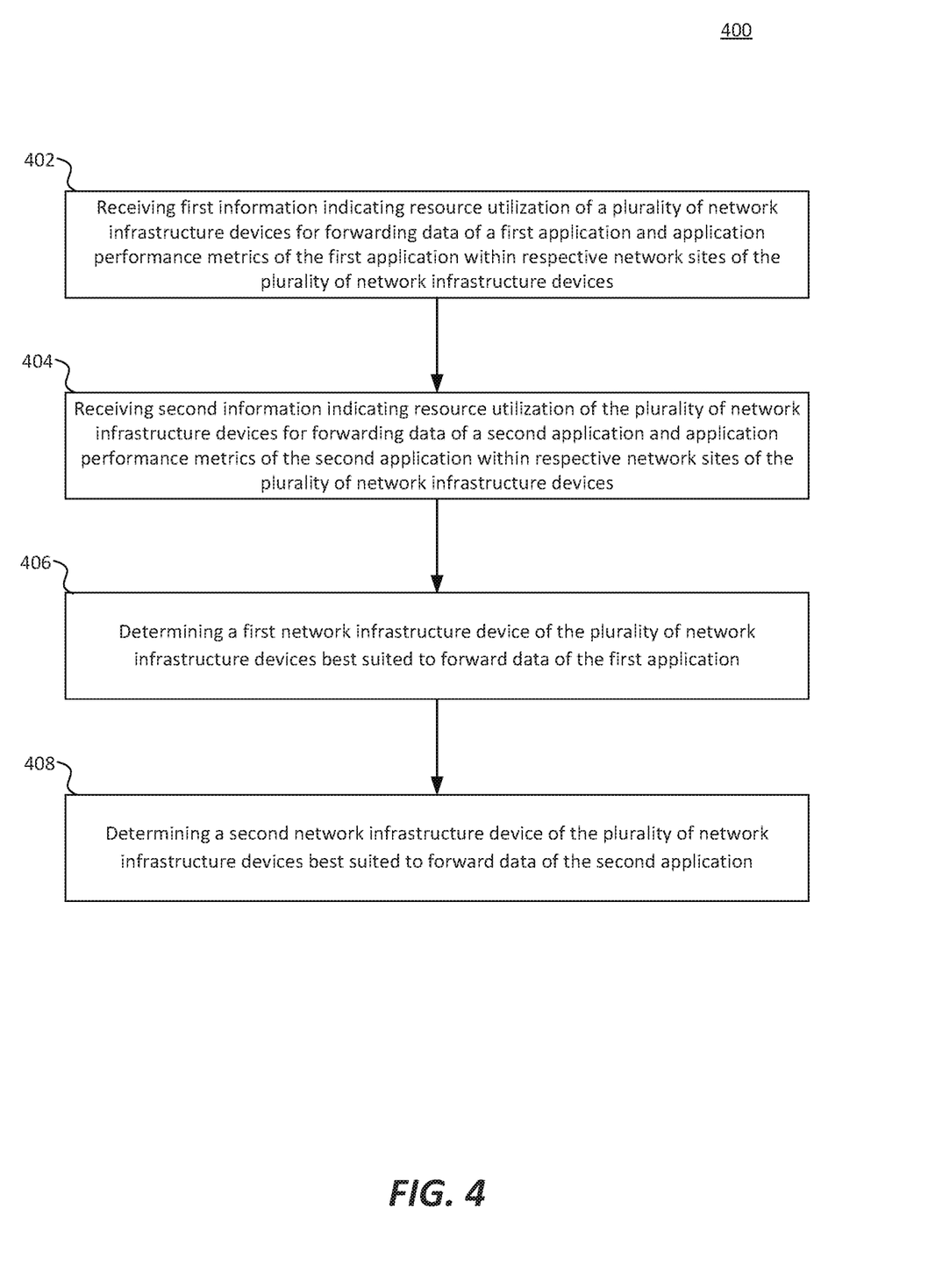
FIG. 4 is a flowchart describing an example method for operating an example SD-WAN.

FIG. 4 is a flowchart describing an example method for operating an example SD-WAN. In some examples, method 400 is encoded as instructions on a non-transitory, computer-readable medium that, when executed by processing circuitry, causes a device to take actions consistent with method 400. In some examples, the device executing instructions encoding method 400 is a network device, such as a cloud based service or a branch gateway.

In block 402, first information is received indicating resource utilization of a plurality of network infrastructure devices for forwarding data of a first application and application performance metrics of the first application within respective network sites of the plurality of network infrastructure devices.

In block 404, second information is received indicating resource utilization of the plurality of network infrastructure devices for forwarding data of a second application and application performance metrics of the second application within respective network sites of the plurality of network infrastructure devices.

In block 406, a first network infrastructure device of the plurality of network infrastructure devices is determined to be best suited to forward data of the first application. In some examples, determining the first network infrastructure device is based in part on information indicating link health of respective WAN links of a plurality of WAN links coupled to the plurality of network infrastructure devices and traversing the Internet. In certain examples, the plurality of network infrastructure devices is a plurality of headend gateways at one or more network sites of a WAN. In certain examples, forwarding data of the first application includes transceiving data with a branch gateway across a WAN link of the plurality of WAN links. In some examples, a subset of the plurality of network infrastructure devices is deployed as a cluster of headend gateways at a single network site.

In block 408, a second network infrastructure device of the plurality of network infrastructure devices is determined to be best suited to forward data of the second application. In some examples, determining the second network infrastructure device is based in part on information indicating link health of respective WAN links of a plurality of WAN links coupled to the plurality of network infrastructure devices and traversing the Internet. In certain examples, the plurality of network infrastructure devices is a plurality of headend gateways at one or more network sites of a WAN. In certain examples, forwarding data of the second application includes transceiving data with a branch gateway across a WAN link of the plurality of WAN links. In some examples, the first network infrastructure device is best suited for forwarding data of the first application based, in part, on the first information and WAN link health information for the WAN traversing the Internet, which connects the branch gateway to the first network infrastructure device, and wherein the second network infrastructure device is best suited for forwarding data of the second application based, in part, on the second information and WAN link health information for a second WAN link traversing the Internet, which connects the branch gateway to the second network infrastructure device.

In some examples, method 400 includes an additional block, wherein third information is received indicating updated resource utilization of the plurality of network infrastructure devices for forwarding data of the first application. The third information may be captured and transmitted after a period of time, after a certain parameter or set of parameters exceed a threshold, or by any other appropriate trigger.

In some examples, method 400 includes an additional block, wherein fourth information is received indicating updated resource utilization of the plurality of network infrastructure devices for forwarding data of the second application. The fourth information may be captured and transmitted after a period of time, after a certain parameter or set of parameters exceed a threshold, or by any other appropriate trigger.

In some examples, method 400 includes an additional block, wherein based in part on the third information and the fourth information, network infrastructure devices of the plurality of network infrastructure devices are determined to be best suited for forwarding data of the first application and data of the second application, respectively. In some examples, the determined network infrastructure devices are the same network infrastructure devices as the previously determined network infrastructure devices of blocks 406 and 408. In some other examples, the determined network infrastructure devices are different network infrastructure devices from the previously determined network infrastructure devices of blocks 406 and 408.

Figure 5:
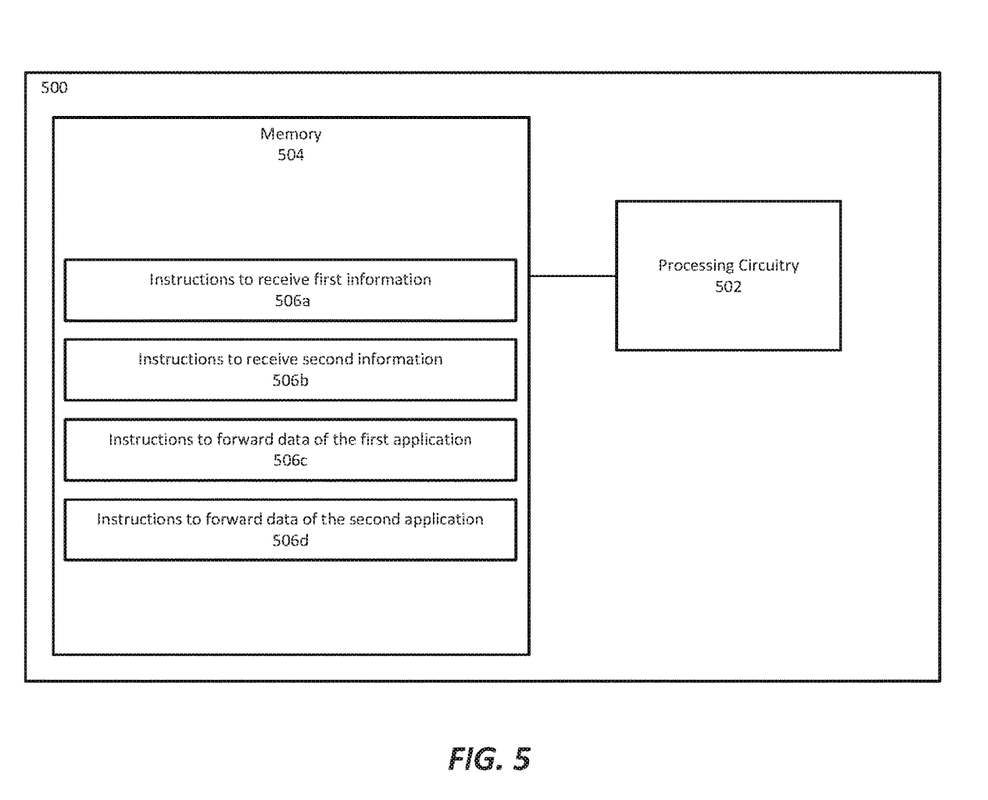
FIG. 5 illustrates an example network device for operating in an example SD-WAN.

FIG. 5 illustrates an example network device for operating in an example SD-WAN. Network device 500 includes processing circuitry 502 coupled to memory 504. Memory 504 includes instructions 506. In some examples, memory 504 is a non-transitory, computer-readable medium and instructions 506 are executed on processing circuitry 502 to cause network device 500 to perform certain actions.

Instructions 506*a* cause device 500 to receive first information indicating resource utilization of a plurality of network infrastructure devices for forwarding data of a first application and application performance metrics of the first application within respective network sites of the plurality of network infrastructure devices.

Instructions 506*b* cause device 500 to receive second information indicating resource utilization of the plurality of network infrastructure devices for forwarding data of a second application and application performance metrics of the second application within respective network sites of the plurality of network infrastructure devices.

Instructions 506*c* cause device 500 to determine a first network infrastructure device of the plurality of network infrastructure devices best suited to forward data of the first application. In some examples, determining the first network infrastructure device is based in part on information indicating link health of respective WAN links of a plurality of WAN links coupled to the plurality of network infrastructure devices and traversing the Internet.

Instructions 506*d* cause device 500 to determine a second network infrastructure device of the plurality of network infrastructure devices best suited to forward data of the second application. In some examples, determining the second network infrastructure device is based in part on information indicating link health of respective WAN links of a plurality of WAN links coupled to the plurality of network infrastructure devices and traversing the Internet.

Flows are groups of network traffic in a SDN network that are routed based on flow-specific rules. For example, a flow may include all network traffic identified as being related to social media applications. All network traffic that is identified as being related to social media applications may be subject to low quality of service requirements in comparison to video or audio streaming. Further, network traffic in the social media flow may be subject to additional security screening (e.g. firewall), role-based limitations (e.g. only the marketing department has access to social media while on the enterprise network), or other routing preferences.

Routes are paths through a network. Often, "flows" and "routes" are used as near-synonyms. "Flows" encompass one or both of the classification of packets to a flow pattern, as well as the path those classified packets take through the SDN overlay network, "Routes" usually refer to the path those packets take through the physical underlay network.

Branch gateways are network infrastructure devices that are placed at the edge of a branch LAN. Often branch gateways are routers that interface between the LAN and a wider network, whether it be directly to other LANs of the WAN via dedicated network links (e.g. MPLS) or to the other LANs of the WAN via the Internet through links provided by an Internet Service Provider connection. Many branch gateways can establish multiple uplinks to the WAN, both to multiple other LAN sites, and also redundant uplinks to a single other LAN site. Branch gateways also often include network controllers for the branch LAN. In such examples, a branch gateway in use in a SD-WAN may include a network controller that is logically partitioned from an included router. The network controller may control infrastructure devices of the branch LAN, and may receive routing commands from a network orchestrator.

Headend gateways (sometimes referred to as VPN concentrators) are network infrastructure devices that are placed at the edge of a core site LAN. Often headend gateways are routers that interface between the LAN and a wider network, whether it be directly to other LANs of the WAN via dedicated network links (e.g. MPLS) or to the other LANs of the WAN via the Internet through links provided by an Internet Service Provider connection, Many headend gateways can establish multiple uplinks to the WAN, both to multiple other LAN sites, and also redundant uplinks to a single other LAN site. Headend gateways also often include network controllers for the core site LAN. In such examples, a headend gateway in use in a SD-WAN may include a network controller that is logically partitioned from an included router. The network controller may control infrastructure devices of the core site LAN, and may receive routing commands from a network orchestrator.

A network orchestrator is a service (e.g. instructions stored in a non-transitory, computer-readable medium and executed by processing circuitry) executed on a computing device that orchestrates switching and routing across a SD-WAN. In some examples, the network orchestrator executes on a computing device in a core site LAN of the SD-WAN. In some other examples, the network orchestrator executes on a cloud computing device. The network orchestrator may be provided to the SD-WAN as a service (aaS). The network orchestrator gathers network operating information from various network infrastructure devices of the SD-WAN, including network traffic load information, network topology information, network usage information, etc. The network orchestrator then transmits commands to various network infrastructure devices of the SD-WAN to alter network topology and network routing in order to achieve various network efficiency and efficacy goals.

A network administrator is a person, network service, or combination thereof that has administrative access to network infrastructure devices and configures devices to conform to a network topology.

A client device is a computing device that is operated or accessed by a network user. Client devices include laptop/desktop computers, tablets/phones/PDAs, servers, Internet of Things devices, sensors, etc.

A virtual local area network (VLAN) is a logical partition of a portion of a WAN. A VLAN may be contained within a certain LAN of the WAN or it may span across multiple LANs of the WAN. VLANs are implemented in layer 2 of the OSI model (the data link layer) and, among other benefits, improve network configurability as the size of the network scales. VLAN capable infrastructure devices may allocate VLANs on a per-port basis or may tag certain data frames with information associating the frames with their respective VLANs. VLANs may be used to group related devices, balance load on certain network infrastructure devices, apply security and routing policies on a broad basis, implement quality of service (QoS), etc.

A network infrastructure device is a device that receives network traffic and forwards the network traffic to a destination. Network infrastructure devices may include, among other devices, controllers, access points, switches, routers, bridges, and gateways. Certain network infrastructure devices may be SDN capable, and thus can receive network commands from a controller or an orchestrator and adjust operation based on the received network commands. Some network infrastructure devices execute packets services, such as application classification and deep packet inspection, on certain network traffic that is received at the network infrastructure device. Some network infrastructure devices monitor load parameters for various physical and logical resources of the network infrastructure device, and report load information to a controller or an orchestrator.

Processing circuitry is circuitry that receives instructions and data and executes the instructions. Processing circuitry may include application specific integrated circuits (ASICs), field programmable gate arrays (FPGAs), microcontrollers (uCs), central processing units (CPUs), graphics processing units (GPUs), microprocessors, or any other appropriate circuitry capable of receiving instructions and data and executing the instructions. Processing circuitry may include one processor or multiple processors. Processing circuitry may include caches. Processing circuitry may interface with other components of a device, including memory, network interfaces, peripheral devices, supporting circuitry, data buses, or any other appropriate component. Processors of a processing circuitry may communicate to one another through shared cache, interprocessor communication, or any other appropriate technology.

Memory is one or more non-transitory computer-readable medium capable of storing instructions and data. Memory may include random access memory (RAM), read only memory (ROM), processor cache, removable media (e.g. CD-ROM, USB Flash Drive), storage drives (e.g. hard drive (HDD), solid state drive (SSD)), network storage (e.g. network attached storage (NAS)), and/or cloud storage. In this disclosure, unless otherwise specified, all references to memory, and to instructions and data stored in memory, can refer to instructions and data stored in any non-transitory computer-readable medium capable of storing instructions and data or any combination of such non-transitory computer-readable media.

A software defined network (SDN) is a network overlaying a physical network that allows a device, such as a network orchestrator, to dynamically configure the topology of the SDN overlay using flows to specific routes through the underlay physical network. Dynamic configuration can include alterations to the network topology based on many factors, including network health and performance, data type, application type, quality of service restrictions (e.g. service level agreements), device load, available bandwidth, business cost, and other factors.

A software defined wide area network (SD-WAN) is a SDN that controls the interaction of various sites of a WAN. Each site may have one or more LANs, and LANs connect to one another via WAN uplinks. Some WAN uplinks are dedicated lines (e.g. MPLS), and others are shared routes through the Internet (e.g. DSL, T1, LTE, 5G, etc.). An SD-WAN dynamically configures the WAN uplinks and data traffic passing through the WAN uplinks to effectively use the resources of the WAN uplinks.

The features of the present disclosure can be implemented using a variety of specific devices that contain a variety of different technologies and characteristics. As an example, features that include instructions to be executed by processing circuitry may store the instructions in a cache of the processing circuitry, in random access memory (RAM), in hard drive, in a removable drive (e.g. CD-ROM), in a field programmable gate array (FPGA), in read only memory (ROM), or in any other non-transitory, computer-readable medium, as is appropriate to the specific device and the specific example implementation. As would be clear to a person having ordinary skill in the art, the features of the present disclosure are not altered by the technology, whether known or as yet unknown, and the characteristics of specific devices the features are implemented on. Any modifications or alterations that would be required to implement the features of the present disclosure on a specific device or in a specific example would be obvious to a person having ordinary skill in the relevant art.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

The invention claimed is:

1. A network infrastructure device, comprising:
   processing circuitry; and
   a non-transitory, computer-readable medium including instructions that, when executed by the processing circuitry, cause the network infrastructure device to:
      receive first information indicating resource utilization of a plurality of headend gateways for forwarding data of a first application;
      receive second information indicating resource utilization of the plurality of branch gateways for forwarding data of a second application;
      based in part on the first information and the second information, forward data of the first application across a WAN link traversing the Internet to a first headend gateway of the plurality of headend gateways best suited to forward data of the first application;
      based in part on the first information and the second information, forward data of the second application across a WAN link traversing the Internet to a second headend gateway of the plurality of headend gateways best suited to forward data of the second application and
      receive third information indicating updated resource utilization of the plurality of headend gateways for forwarding data of the first application;
      receive fourth information indicating updated resource utilization of the plurality of headend gateways for forwarding data of the second application; and
      forward data of the first application and data of the second application to headend gateways of the plurality of headend gateways best suited for forwarding data of the first application and data of the second application, respectively.

2. The network infrastructure device of claim 1, wherein the network infrastructure device is a branch gateway.

3. The network infrastructure device of claim 1, wherein the first information further indicates application performance metrics of the first application within respective network sites of the plurality of headend gateways and the second information further indicates application performance metrics of the second application within respective network sites of the plurality of headend gateways.

4. The network infrastructure device of claim 1, wherein data of the first application is forwarded to a first set of headend gateways and data of the second application is forwarded to a second set of headend gateways.

5. The network infrastructure device of claim 1, wherein the first headend gateway is best suited for forwarding data of the first application based, in part, on the first information and WAN link health information for the WAN traversing the Internet to the first headend gateway.

6. The network infrastructure device of claim 1, wherein the second headend gateway is best suited for forwarding data of the second application based, in part, on the second information and WAN link health information for the WAN link traversing the Internet to the second headend gateway.

7. A network orchestrator, comprising:
processing circuitry; and
a memory including instructions that, when executed by the processing circuitry, cause the network orchestrator to:
receive first information indicating resource utilization of a plurality of network infrastructure devices for forwarding data of a first application and application performance metrics of the first application within respective network sites of the plurality of network infrastructure devices;
receive second information indicating resource utilization of the plurality of network infrastructure devices for forwarding data of a second application and application performance metrics of the second application within respective network sites of the plurality of network infrastructure devices;
determine, based in part on the first information, a first device of the plurality of network infrastructure devices best suited to forward data of the first application, wherein the plurality of network infrastructure devices is a plurality of headend gateways at one or more network sites of a wide area network (WAN), and wherein forwarding data of the first application includes transceiving data with a branch gateway across a WAN link traversing the Internet;
determine, based in part on the second information, a second device of the plurality of network infrastructure devices best suited to forward data of the second application;
transmit instructions to the branch gateway to forward data of the first application via the first device and forward data of the second application via the second device and
receive third information indicating updated resource utilization of the plurality of network infrastructure devices for forwarding data of the first application;
receive fourth information indicating updated resource utilization of the plurality of network infrastructure devices for forwarding data of the second application; and
transmit instructions to the branch gateway to forward data of the first application and data of the second application to network infrastructure devices of the plurality of network infrastructure devices best suited for forwarding data of the first application and data of the second application, respectively.

8. The network orchestrator of claim 7, wherein the network orchestrator is a cloud service.

9. The network orchestrator of claim 7, wherein the plurality of network infrastructure devices are a plurality of headend gateways.

10. The network orchestrator of claim 7, wherein data of the first application is forwarded to a first set of network infrastructure devices and data of the second application is forwarded to a second set of network infrastructure devices.

11. The network orchestrator of claim 7, wherein the first network infrastructure device is best suited for forwarding data of the first application based, in part, on the first information and WAN link health information for the WAN traversing the Internet, which connects the branch gateway to the first network infrastructure device.

12. The network orchestrator of claim 7, wherein the second network infrastructure device is best suited for forwarding data of the second application based, in part, on the second information and WAN link health information for a second WAN link traversing the Internet, which connects the branch gateway to the second network infrastructure device.

13. A method, comprising:
receiving, at a first network device, first information indicating resource utilization of a plurality of network infrastructure devices for forwarding data of a first application and application performance metrics of the first application within respective network sites of the plurality of network infrastructure devices;
receiving, at the first network device, second information indicating resource utilization of the plurality of network infrastructure devices for forwarding data of a second application and application performance metrics of the second application within respective network sites of the plurality of network infrastructure devices;
determining, by the first network device and based in part on the first information and the second information, a first network infrastructure device of the plurality of network infrastructure devices best suited to forward data of the first application,
wherein the plurality of network infrastructure devices is a plurality of headend gateways at one or more network sites of a wide area network (WAN),
wherein the determining is further based in part on information indicating link health of respective WAN links of a plurality of WAN links coupled to the plurality of network infrastructure devices and traversing the Internet, and
wherein forwarding data of the first application includes transceiving data with a branch gateway across a WAN link of the plurality of WAN links;
determining, by the first network device and based in part on the first information and the second information, a second network infrastructure device of the plurality of network infrastructure devices best suited to forward data of the second application and
receiving third information indicating updated resource utilization of the plurality of network infrastructure devices for forwarding data of the first application;
receiving fourth information indicating updated resource utilization of the plurality of network infrastructure devices for forwarding data of the second application; and
determining, by the first network device and based in part on the third information and the fourth information, network infrastructure devices of the plurality of network infrastructure devices best suited for forwarding data of the first application and data of the second application, respectively.

14. The method of claim 13, wherein the first network device is a cloud service.

15. The method of claim 13, wherein the first network device is a branch gateway.

16. The method of claim 13, wherein a subset of the plurality of network infrastructure devices is deployed as a cluster of headend gateways at a single network site.

17. The method of claim 13, wherein the first network infrastructure device is best suited for forwarding data of the first application based, in part, on the first information and WAN link health information for the WAN traversing the Internet, which connects the branch gateway to the first network infrastructure device, and wherein the second network infrastructure device is best suited for forwarding data of the second application based, in part, on the second information and WAN link health information for a second WAN link traversing the Internet, which connects the branch gateway to the second network infrastructure device.

* * * * *